(12) United States Patent
Kai

(10) Patent No.: US 7,908,418 B2
(45) Date of Patent: Mar. 15, 2011

(54) STORAGE SYSTEM, STORAGE DEVICE, AND HOST DEVICE

(75) Inventor: Hironori Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 12/271,898

(22) Filed: Nov. 16, 2008

(65) Prior Publication Data

US 2009/0132740 A1    May 21, 2009

(30) Foreign Application Priority Data

Nov. 16, 2007  (JP) ................................. 2007-297561
Oct. 23, 2008  (JP) ................................. 2008-273427

(51) Int. Cl.
*G06F 13/36* (2006.01)
*G06F 13/00* (2006.01)

(52) U.S. Cl. ............. 710/302; 710/316; 710/74; 710/38

(58) Field of Classification Search .......... 710/300–304, 710/316–317, 8–11, 36–38, 72–74
See application file for complete search history.

(56) References Cited

U.S. PATENT DOCUMENTS

| | | | | |
|---|---|---|---|---|
| 5,579,491 A | * | 11/1996 | Jeffries et al. ................. | 710/302 |
| 6,247,079 B1 | * | 6/2001 | Papa et al. ..................... | 710/302 |
| 6,772,263 B1 | * | 8/2004 | Arramreddy ................. | 710/302 |
| 7,266,730 B2 | * | 9/2007 | Umeda ............................ | 714/41 |
| 7,346,599 B2 | * | 3/2008 | Ogawa et al. .................... | 726/2 |
| 7,587,676 B2 | * | 9/2009 | Gomez et al. ................. | 715/741 |
| 2007/0260775 A1 | | 11/2007 | Bita et al. | |
| 2008/0184022 A1 | * | 7/2008 | Peacock ........................... | 713/2 |
| 2008/0184217 A1 | | 7/2008 | Kai | |
| 2008/0301672 A1 | * | 12/2008 | Rao et al. ...................... | 717/177 |
| 2009/0049337 A1 | * | 2/2009 | Hsieh et al. .................... | 714/14 |
| 2009/0164724 A1 | * | 6/2009 | Hirose ......................... | 711/115 |
| 2010/0008510 A1 | * | 1/2010 | Zayas ........................... | 380/283 |

FOREIGN PATENT DOCUMENTS

| | | |
|---|---|---|
| JP | 09-160773 A | 6/1997 |
| JP | 2007-272496 A | 10/2007 |
| JP | 2008-186296 A | 8/2008 |

* cited by examiner

*Primary Examiner* — Christopher B Shin
(74) *Attorney, Agent, or Firm* — Fujitsu Patent Center

(57) ABSTRACT

Provided is a storage system including a host device and a storage device connected to the host device through multiple paths and configured to perform hot-swap of firmware. The host device generates and sends an inquiry command to inquire about whether to allow firmware exchange. In response to the command, the storage device generates information about whether to allow firmware exchange in a control unit connected to a path where the command is received, as response information to the inquiry command and sends the generated information to the host device. The host device determines whether to allow firmware exchange in accordance with the received response information, and if firmware exchange is enabled, generates information about multiple paths with the storage device.

5 Claims, 9 Drawing Sheets

FIG. 4A

| PATH NUMBER | HOST-WWN | CM NUMBER | EXCHANGE ORDER NUMBER |
|---|---|---|---|
| 1 | WWN-A | CM22 | 1 |
| 2 | WWN-B | CM32 | 2 |

FIG. 4B

| PATH NUMBER | HOST-WWN | CM NUMBER | EXCHANGE ORDER NUMBER |
|---|---|---|---|
| 1 | WWN-A | CM22 | 1 |
| 2 | WWN-B | CM22 | 1 |

FIG. 6

| HOST ID | HOST-WWN | STATE INFORMATION |
|---------|----------|-------------------|
| 11 | WWN-A | NORMAL |
| 11 | WWN-B | NORMAL |
| 61 | WWN-C | NORMAL |
| 61 | WWN-D | NORMAL |

91

STORAGE SYSTEM, STORAGE DEVICE, AND HOST DEVICE

BACKGROUND

1. Field of the Invention

The present invention relates to a technique of constructing a multipath of a storage system in consideration of redundancy for hot-swap of firmware in a storage device.

2. Description of the Related Art

A storage system is composed of a host and a storage device connected to the host. Upon hot-swap of firmware in such a storage device, if plural control modules (hereinafter referred to as "CMs") having firmware components installed thereto are provided, the firmware components are exchanged in two stages, the first half and the second half. For example, if the storage device includes four CMs, firmware components of two CMs are first exchanged at the same time. After the completion of the exchange, firmware components of the remaining two CMs are exchanged. The storage device and the host constitute multipath construction. Each path is connected to each CM to thereby enable hot-swap of firmware without stopping an operation. Next, an example of hot-swap of firmware in a device including two CMs is described.

FIGS. 1A to 1D are explanatory views of firmware exchange of the related art. A storage system is composed of a host 101 and a storage device 102 having two paths connected to the host 101. (FIG. 1A) In a general state, data can be transferred to the storage device 102 from the host 101 through the two paths. (FIG. 1B) During exchange of firmware of the first half (CM 0), data is transferred between the host 101 and the storage device 102 only through the path on the CM 1 side. (FIG. 1C) During exchange of firmware of the second half (CM 1), data is transferred between the host 101 and the storage device 102 through the path on the CM 0 side where firmware exchange is completed. (FIG. 1D) After the completion of exchange of firmware of the second half, data can be transferred through the two paths.

As described above, the storage device 102 and the host 101 constitute multipath construction. Each path is connected to each CM to thereby enable hot-swap of firmware components without stopping an operation.

However, if firmware exchange is carried out under the following circumstances, connectivity of all paths between the storage device and the host is abnormal. As a result, data transfer is disabled and an operation is stopped.

(1) All cables connected between the storage device and the host are connected to the first half, the CM 0.

(2) All cables connected between the storage device and the host are connected to the second half, the CM 1.

In the environment where multipath information has been already generated, if active firmware exchange is carried out under this condition, an operation is stopped. However, the host needs to be reactivated in order to change path construction. As a result, the operation is further suspended. Therefore, in this case, this firmware exchange is the same as inactive firmware exchange.

SUMMARY

Accordingly, it is an object of the present technique to provide a storage system, which construct redundant multipath for hot-swap of firmware.

According to an aspect of an embodiment, a storage system includes a host device and a storage device connected to the host device through a multipath and configured to perform hot-swap of firmware.

The host device includes a command control unit for generating a inquiry command about whether to allow firmware exchange, a command transmitting unit for transmitting the generated inquiry command to the storage device, a response information receiving unit for receiving a response information from the storage device as a response to the inquiry command, a determination unit for determining whether to allow the firmware exchange of the storage device in accordance with the response information, and a path information generating unit for generating multipath information regarding the multipath with the storage device upon determining the firmware exchange being enabled.

The storage device includes a receiving unit for receiving the inquiry command, a response information generating unit for generating information about whether to allow the firmware exchange as response information to the received inquiry command, and a transmitting unit for transmitting the generated response information to the host device.

BRIEF DESCRIPTION OF THE DRAWINGS

FIGS. 4A and 4B are explanatory views of a path configuration table;

FIG. 6 is an explanatory view of a management table;

DESCRIPTION OF THE PREFERRED EMBODIMENTS

Figure 1A:
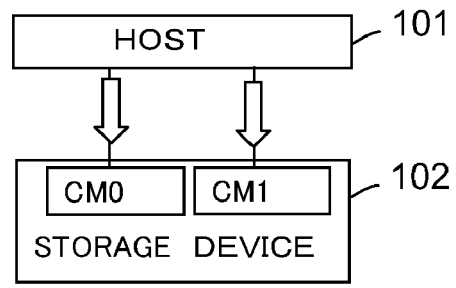
FIGS. 1A to 1D are explanatory views of firmware exchange of prior art.
Figure 1B:
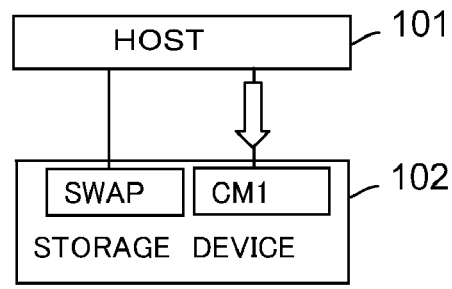
Figure 1C:
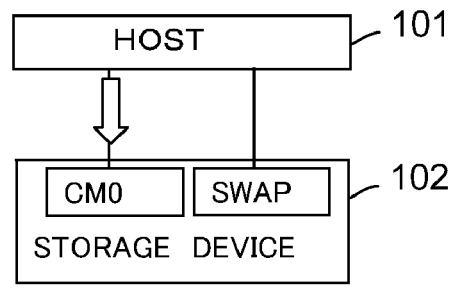
Figure 1D:
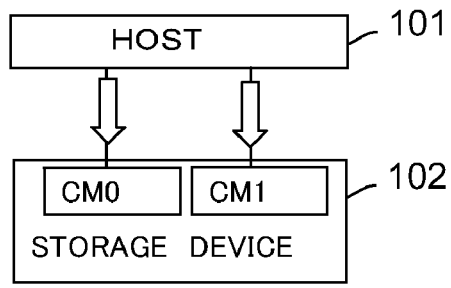
Figure 2:
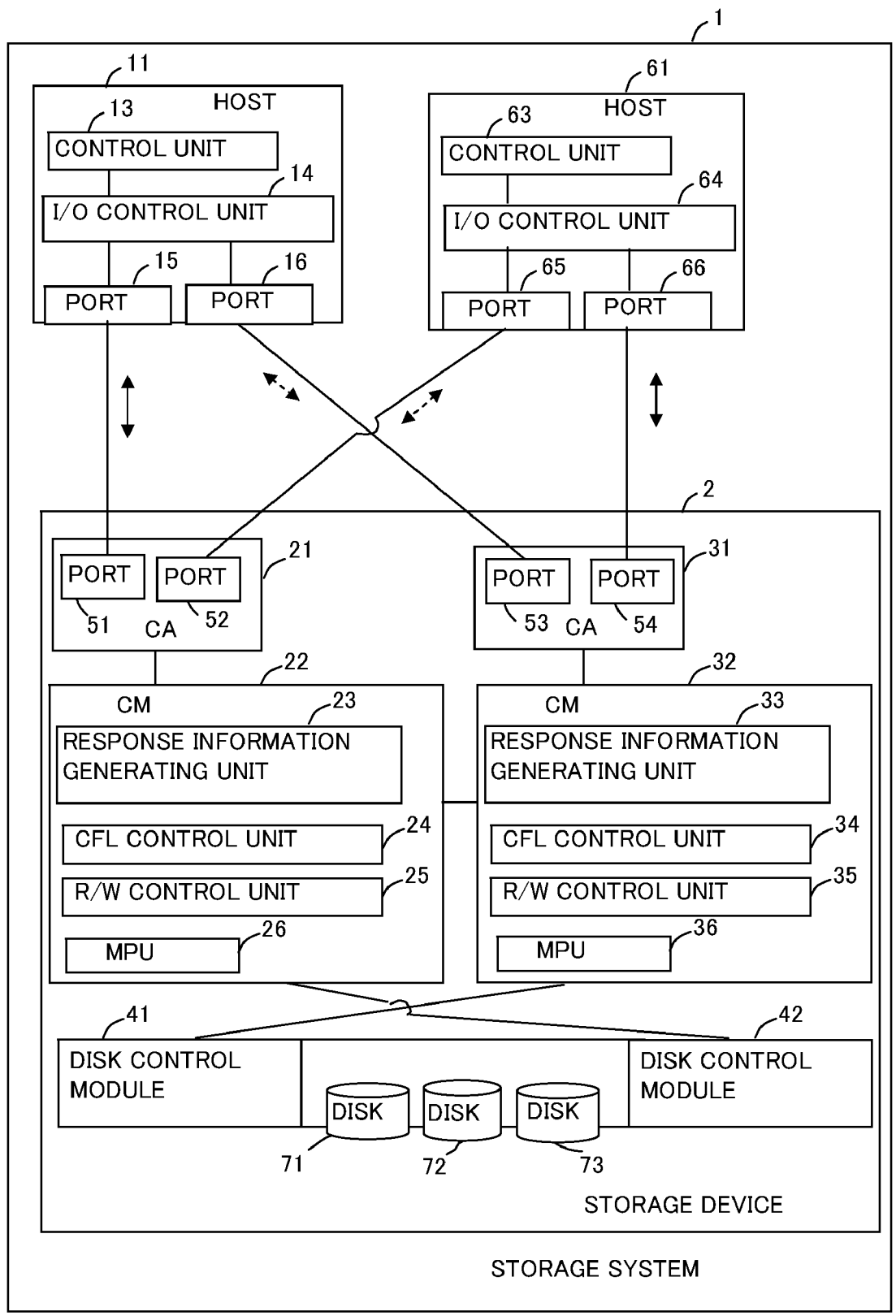
FIG. 2 is a diagram of a storage system according to an embodiment.

FIG. 2 is a diagram of a storage system according to an embodiment.

A storage system 1 includes, for example, two hosts 11 and 61, and a storage device 2. The host 11 and the host 61 each include two paths.

The host 11 includes a control unit 13, an input/output (hereinafter referred to as "I/O") control unit 14, a port 15, and a port 16.

The host 61 includes a control unit 63, an I/O control unit 64, a port 65, and a port 66.

The host 11 or the host 61 performs multipath control on connection with the storage device 2.

The multipath control means to connect the host 11 or the host 61 with one or more storage devices 2 through plural paths. In general, the host 11 or the host 61 accesses the storage device 2 through a main path connected thereto. If any failure occurs in the main path, the host accesses the storage device 2 through a sub path connected thereto. According to such multipath control, even if a failure occurs in one path of any storage device 2, the host 11 or the host 61 can access the storage device through another path connected to the storage device. Thus, system's fault-tolerance for a path failure can be enhanced.

On the other hand, the storage device 2 includes a channel adaptor (hereinafter referred to as "CA") 21, a CA 31, a controller module (hereinafter referred to as "CM") 22, a CM 32, a disk control module 41, a disk control module 42, and disks 71 to 73.

A main path between the host 11 and the storage device 2 is a connection route of the port 15, the CA 21, and the CM 22. Further, a sub path therebetween is a connection route of the port 16, the CA 31, and the CM 32. A combination of the paths is set as the default.

On the other hand, a main path between the host 61 and the storage device 2 is a connection route of the port 66, the CA 31, and the CM 32. Further, a sub path therebetween is a connection route of the port 65, the CA 21, and the CM 22. A combination of the paths is set as the default.

(Explanation of Host)

The control unit 13 controls the entire host 11. The control unit 63 controls the entire host 61. Therefore the control units 13 and 63 control start-up processing and job processing. The control units 13 and 63 each include a processor for controlling an operation.

The I/O control units 14 and 64 issue an I/O command to control data read/write from/to the storage device 2. Examples of the I/O command include an inquiry command to check a connection state of a path of the storage device 2, a write command to write data to the storage device 2, and a state notification command to notify a user of a connection state.

The ports 15, 16, 65, and 66 are interface ports connected to the storage device 2 through a fibre channel or the like. The ports control data communication between the host 11 or 61 and the storage device 2. The ports transmit a command as a command transmitting unit or receive response information as a response information receiving unit, for example. Moreover, each port is given a unique 8-byte serial number WWN (world wide name). For example, the port 15 is given a WWN-A, the port 16 is given a WWN-B, the port 65 is given a WWN-C, and the port 66 is given a WWN-D.

Figure 3:
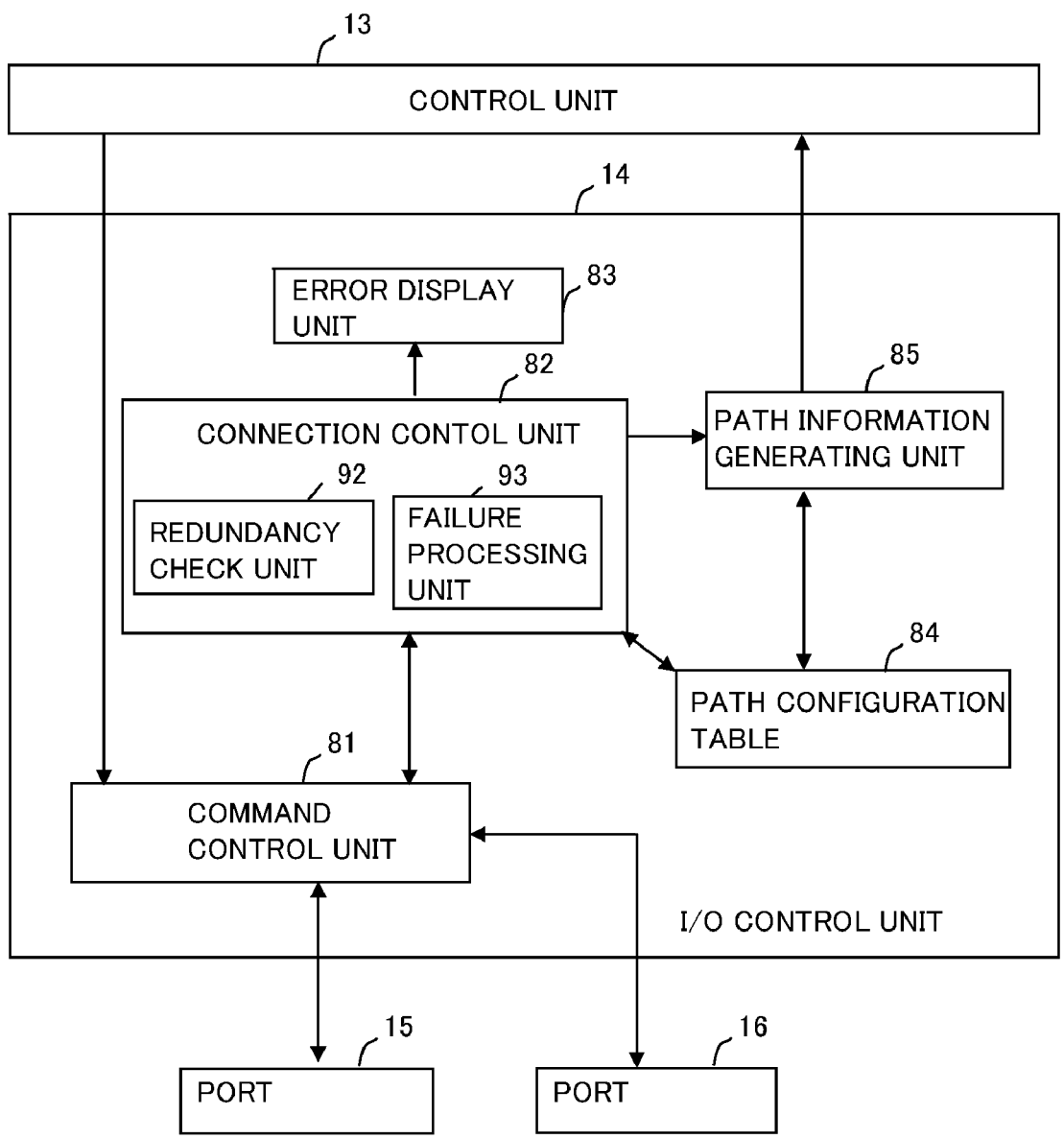
FIG. 3 is an explanatory view of an I/O control unit of a host.

FIG. 3 is an explanatory view of an I/O control unit of a host.

The I/O control unit 14 is described next. The I/O control unit 14 includes a command control unit 81, a connection control unit 82, an error display unit 83, a path configuration table 84, and a path information generating unit 85. The I/O control unit 64 has similar configuration. The command control unit 81 issues a write command, a read command, etc. to each path between the host 11 or 61 and the storage device 2 in response to an instruction from the control unit 13. Further, the command control unit 81 issues a state notification command and an inquiry command in response to an instruction from the connection control unit 82. In addition, the command control unit 81 receives response information from the storage device 2 as a response to the inquiry command and passes the information to the connection control unit 82.

The inquiry command to the storage device 2 is to inquire about a CM number for identifying the CM 22 or CM 32 connected to a path and the exchange order of each firmware of the CM 22 or CM 32. The response information from the storage device 2 to the inquiry command includes CA-WWN information of the port 51 or 52 of the CA 21 or WWN information of the port 53 or 54 of the CA 31. The CM number refers to an identification number of the CM.

The exchange order refers to the order in which CMs are subjected to controller firmware loading (hereinafter referred to as "CFL"). The CFL means exchange of each firmware installed to the CM 22 or 32. The CFL is executed in two stages, the first half and the second half. For example, if the first half of the CFL is targeted at the CM 22, the exchange order thereof is set to "1". If the second half of the CFL is targeted at the CM 32, the exchange order thereof is set to "2". If two or more CMs in the storage device 2 are provided, the CMs are divided into several groups, and the firmware exchange order is determined on a group basis.

Referring back to FIG. 3, a detailed description is given below.

The connection control unit 82 has a redundancy check unit 92 and a failure processing unit 93. The redundancy check unit 92 issues inquiry command for checking redundancy of path between the storage device 2 and the host 11. And the redundancy check unit 92 checks redundancy of the path based on the response information from the storage device 2 to the inquiry command transmitted to the storage device 2. In addition, the connection control unit 82 prepares the path configuration table 84 based on path-specific CM number and exchange order number included in the response information from the storage device 2 in order to check redundancy. After the completion of generating the path configuration table 84 for all paths, the redundancy check unit 92 checks whether the exchange orders are the same exchange orders.

If the exchange orders are the same exchange orders, the paths are considered as not redundant, and the redundancy check unit 92 sends an error message for warning toward the error display unit 83. When the paths are considered as not redundant for failure of the path, the redundancy check unit 92 sends an error message for warning toward the error display unit 83. Then the redundancy check unit 92 requests the command control unit 81 to issue a state notification command to notify the storage device 2 of abnormal state.

If the exchange order differs between the paths, the paths are considered as redundant, and the redundancy check unit 92 requests the path information generating unit 85 to construct multipath and then, requests the command control unit 81 to issue a state notification command to notify the storage device 2 about a normal state. The failure processing unit 93 regularly issues the inquiry command in the job processing and detects the failure of the path or recovery of the path. Furthermore the failure processing unit 93 determines to be failure of the storage device 2, for example, when normal response information from the storage device 2 to the inquiry command transmitted to storage device 2 is not received. The failure is, for example, the failure of the disks 71 to 73. And the failure processing unit 93 determines to be recovery of the path when the normal response information to the inquiry command transmitted to the storage device 2 after the failure of the path is received. A maintenance person recovers the failure of the path by replacement of failed units.

When the failure processing unit 93 determines to be the failure of the path, the failure processing unit 93 sends an error message for warning toward the error display unit 83. And when the failure processing unit 93 determines to be the recovery of the path, the failure processing unit 93 sends a recovery message toward the error display unit 83.

The error display unit 83 displays the error message and the recovery message to the maintenance person. The path configuration table 84 shows path-specific connection construction. The path information generating unit 85 generates path information about a path among the control unit 13 and the CM 22 or 32 of the storage device 2 and the disks 71 to 73 based on the response information from the storage device 2. The control unit 13 controls data read/write from/to the disks 71 to 73 based on the generated path information.

FIGS. 4A and 4B are explanatory views of the path configuration table.

The path configuration table 84 of the host 11 is described next. The path configuration table 84 includes a path number, a host-WWN, a CM number, and the exchange order number.

FIG. 4A shows the path configuration table 84 under a normal condition.

As for a path number 1, WWN-A is set as the host WWN, CM 22 is set as the CM number, and "1" is set as the exchange order number.

As for a path number 2, WWN-B is set as the host WWN, CM 32 is set as the CM number, and "2" is set as the exchange order number.

FIG. 4B shows the path configuration table 84 under an abnormal condition.

As for a path number 1, WWN-A is set as the host WWN, CM 22 is set as the CM number, and "1" is set as the exchange order number.

As for a path number 2, WWN-B is set as the host WWN, CM 32 is set as the CM number, and "1" is set as the exchange order number.

Figure 5:
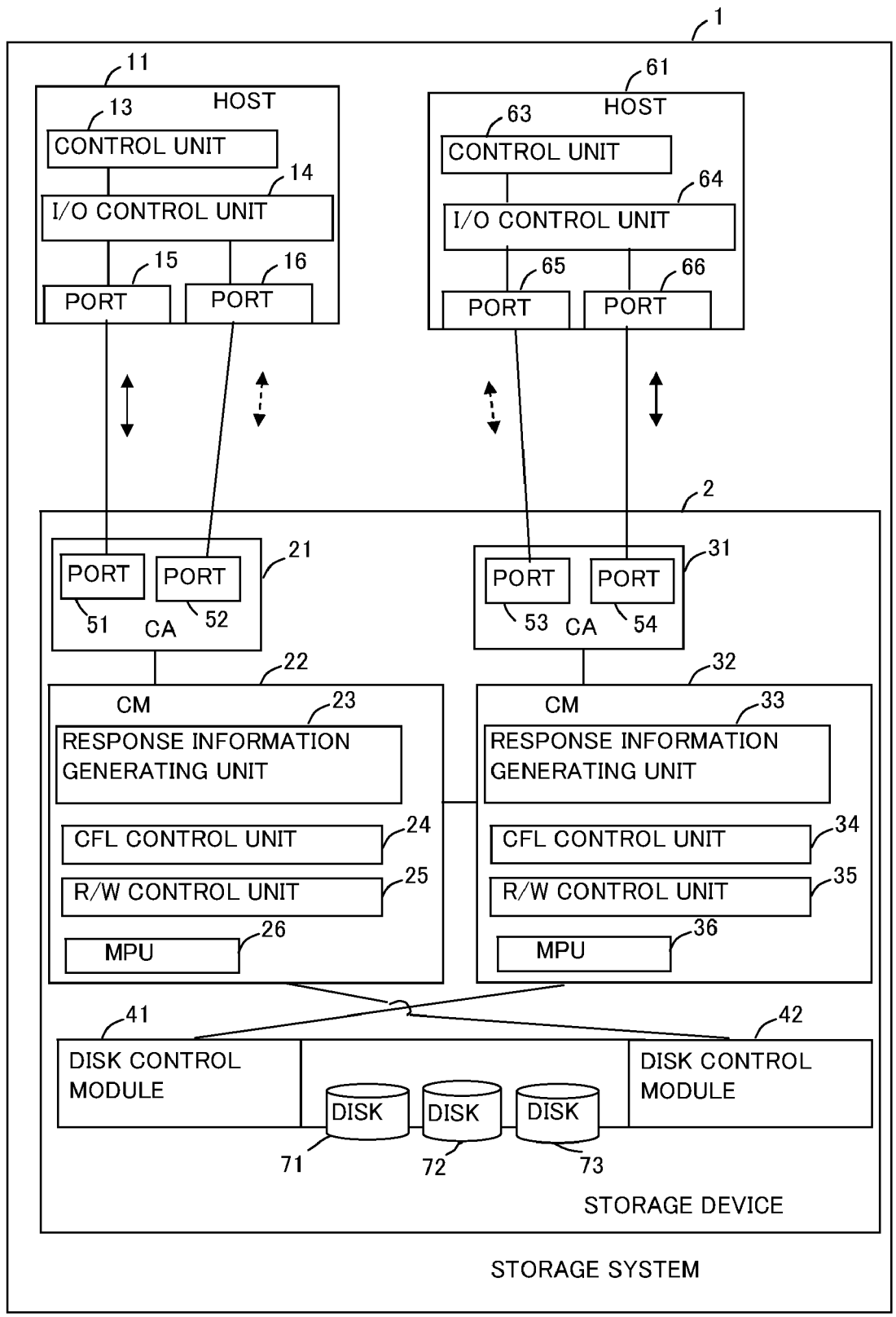
FIG. 5 is a diagram of an example of erroneous connection.

FIG. 5 is a diagram of an example of erroneous connection.

FIGS. 4A and 4B indicate to be different about CM number, and the exchange order number.

The connection between the host 11 and the storage device 2 is described as an example of the erroneous connection. The path configuration table 84 in FIG. 5 is shown in FIG. 4B.

The host 11 includes the ports 15 and 16 for communication control.

The port 15 is connected to the CM 22 through the port 51 of the CA 21. This path is the path numbered "1". The port 16 is connected to the CM 22 through the port 52 of the CA 21. This path is the path numbered "2". To be specific, the path numbered "1" and the path numbered "2" are both connected to the CM 22. In this case, if the CM 22 is subjected to CFL, the storage device 2 cannot receive data from the host 11. As a result, an operation is stopped. Thus, the host 11 displays an error message and notifies a maintenance person about the error. Then, the host 11 instructs the maintenance person to reconnect a connection cable.

(Explanation of Storage Device)

Referring back to FIG. 2, a detailed description is given below.

The CA 21 is connected to the hosts 11 and 61. The CA 21 controls communications between the hosts 11 and the storage device 2. The CA 21 controls communications between the hosts 61 and the storage device 2. Further, the CA 21 is connected to the CM 22. The CA 21 includes the ports 51 and 52 for communication control, which are connected to the host 11 or the host 61. The ports 51 and 52 receive a command as a receiving unit or transmit response information as a transmitting unit. The ports 51 and 52 each have a CA-WWN.

The CA 31 is connected to the hosts 11 and 61. The CA 31 controls communications between the hosts 11 and the storage device 2. The CA 31 controls communications between the hosts 61 and the storage device 2. Further, the CA 31 is connected to the CM 32. The CA 31 includes the ports 53 and 54 for communication control, which are connected to the host 11 or 61. The ports 53 and 54 receive a command as a receiving unit or transmit response information as a transmitting unit. The ports 53 and 54 each have a CA-WWN.

The disk control modules 41 and 42 control data read/write from/to the disks 71 to 73. The disks 71 to 73 are data storage devices. The CMs 22 and 32 execute control to store data received from the host 11 or 61 in the disks 71 to 73 through the disk control module 41 or 42 and to transmit data read from the disks 71 to 73 to the host 11 or 61 through the disk control module 41 or 42. Further, the CMs 22 and 32 control the CFL or the like.

The CM 22 includes a response information generating unit 23, a CFL control unit 24, a read/write control unit (hereinafter referred to as "R/W control unit") 25, and an MPU 26 as a control unit of the storage device 2. For example, the response information generating unit 23, the CFL control unit 24, and the read/write control unit (hereinafter referred to as "R/W control unit") 25 are firmwares that operate by MPU 26.

The CM 32 includes a response information generating unit 33, a CFL control unit 34, a R/W control unit 35, and an MPU 36 as a control unit of the storage device 2. For example, the response information generating unit 33, the CFL control unit 34, and the read/write control unit (hereinafter referred to as "R/W control unit") 35 are firmwares that operate by MPU 36.

The response information generating units 23 and 33 generate response information as a response to an inquiry command. The response information includes a CA-WWN, a CM number, and the firmware exchange order number.

The CFL control units 24 and 34 perform firmware exchange for revision.

The CFL is first performed on the first half, the CM 22. Next, the CFL is performed on the second half, the CM 32. Thus, a management table 91 for determining whether to allow firmware exchange is set. The management table 91 (reference to FIG. 6) stores a normal/abnormal path state corresponding to a state notification command from the host 11 or 61.

FIG. 6 is an explanatory view of the management table.

The management table 91 lists a host ID, a host-WWN, and state information.

The host ID represents an identification number of the host 11 or 61. The host-WWN represents an identification number of the port 15, 16 or the port 65, 66.

The state information "normal" represents that a path is normal. The state information "abnormal" represents that a path is abnormal.

In the management table 91 of FIG. 6, all paths are normal. Thus, firmware exchange can be performed when all paths are normal. Here, CFL is carried out under such a condition that one side of the redundant configuration is assured. For example, during revision of the firmware of the CM 22, the CM 32 is put into a general state. During revision of the firmware of the CM 32, the CM 22 is put into a general state. The general state means a state of being communicable with the host 11 or 61.

Referring back to FIG. 2, a detailed description is given below.

The R/W control units 25 and 35 control data read/write between the disks 71 to 73 and the host 11 or 61 through the disk control module 41 or 42.

The MPU 26 controls the entire CM 22. The MPU 36 controls the entire CM 32.

(Explanation of Operation)

Upon firmware exchange in the storage device 2, required is a function of executing revision of the firmware without stopping I/O control of the host 11 or 61. Upon the CFL in the storage device 2, firmware revision is controlled utilizing the redundant configuration in the storage device 2 without disconnecting paths to the disks 71 to 73.

In order to effectively execute the CFL, the host 11 or 61 automatically communicates with the storage device 2 in a boot sequence of the host 11 or 61 to check redundancy for the CFL. If the check result shows that path connection configuration has no redundancy, a warning message is output. As a result, a maintenance person can find a defect in the configuration at an early stage and detect an error before the CFL.

To elaborate, at the time of automatically constructing multipath in the start-up processing of the host 11 or 61, a connection state of each cable between the host 11 or 61 and the storage device 2 is checked. If all cables are connected to the CM 22 subjected to the CFL on the first half, a message to that effect is output. As a result, when all cables are connected to the CM 22 subjected to the CFL on the first half, multipath is not constructed. If all cables are connected to the CM 32 subjected to the CFL on the second half, a message to that effect is output. As a result, when the all cables are connected to the CM 32 subjected to the CFL on the second half, multipath is not constructed. On the other hand, if a connection state of each cable is normal, the host 11 or 61 constructs multipath.

As discussed previously, the host 11 or 61 constructs the multipath when the redundancy of the path in the start-up processing is detected.

However, if the failure of the path occurs in the job processing after the start-up processing and the CFL is performed, the job processing might stop. Therefore when the host 11 or 61 detects the failure of the path, the host 11 or 61 checks the redundancy of the path for CFL. As a result, when the host 11 or 61 determines that the storage system 1 has not the redundancy of the path for CFL, the host 11 or 61 sends the error message for warning toward the error display unit 83.

And when the host 11 or 61 detects the recovery of the path, the host 11 or 61 checks the redundancy of the path for CFL. When the host 11 or 61 determines that the storage system 1 has the redundancy of the path for CFL, the host 11 or 61 sends the recovery message toward the error display unit 83.

The above-mentioned processing is the explanation of the failure of the path and recovery of the path. However, the same processing of host 11 or 61 is executed if the path is increased or decreased.

Figure 7:
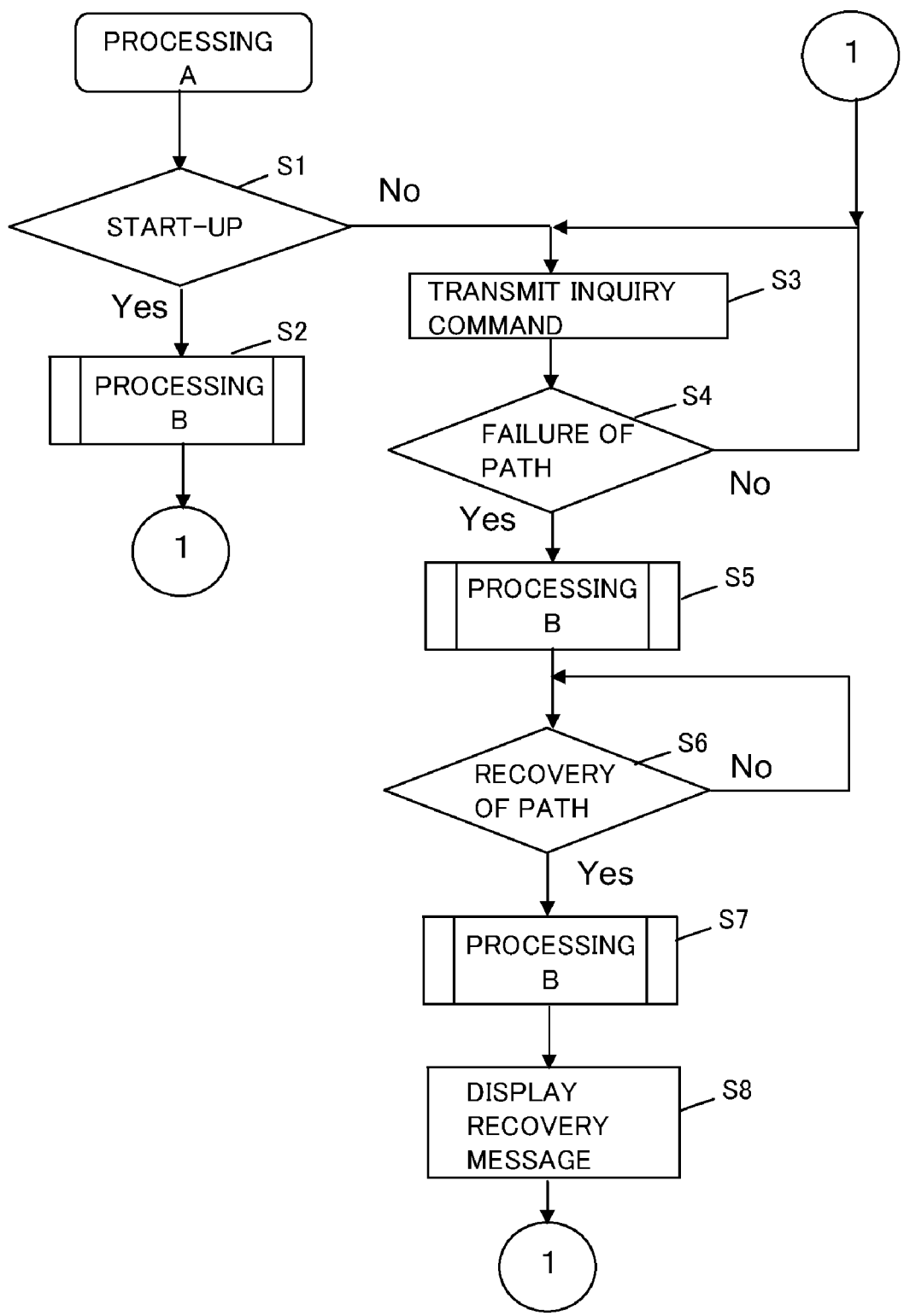
FIG. 7 is a flowchart of processing A of a host.

FIG. 7 is a flowchart of processing A of a host. The following explanation is explanation of the processing A of host 11. Explanation of processing of host 61 is omitted for the explanation similar to the processing A of host 11.

First of all, the I/O control unit 14 checks whether state of processing of the host 11 is start-up processing (step S1).

When the state of processing is start-up processing, processing B is executed (step S2). The I/O control unit 14 advances the processing to step S3 when processing B ends. The processing B is processing that checks the redundancy of path between host 11 and storage device 2.

Figure 8:
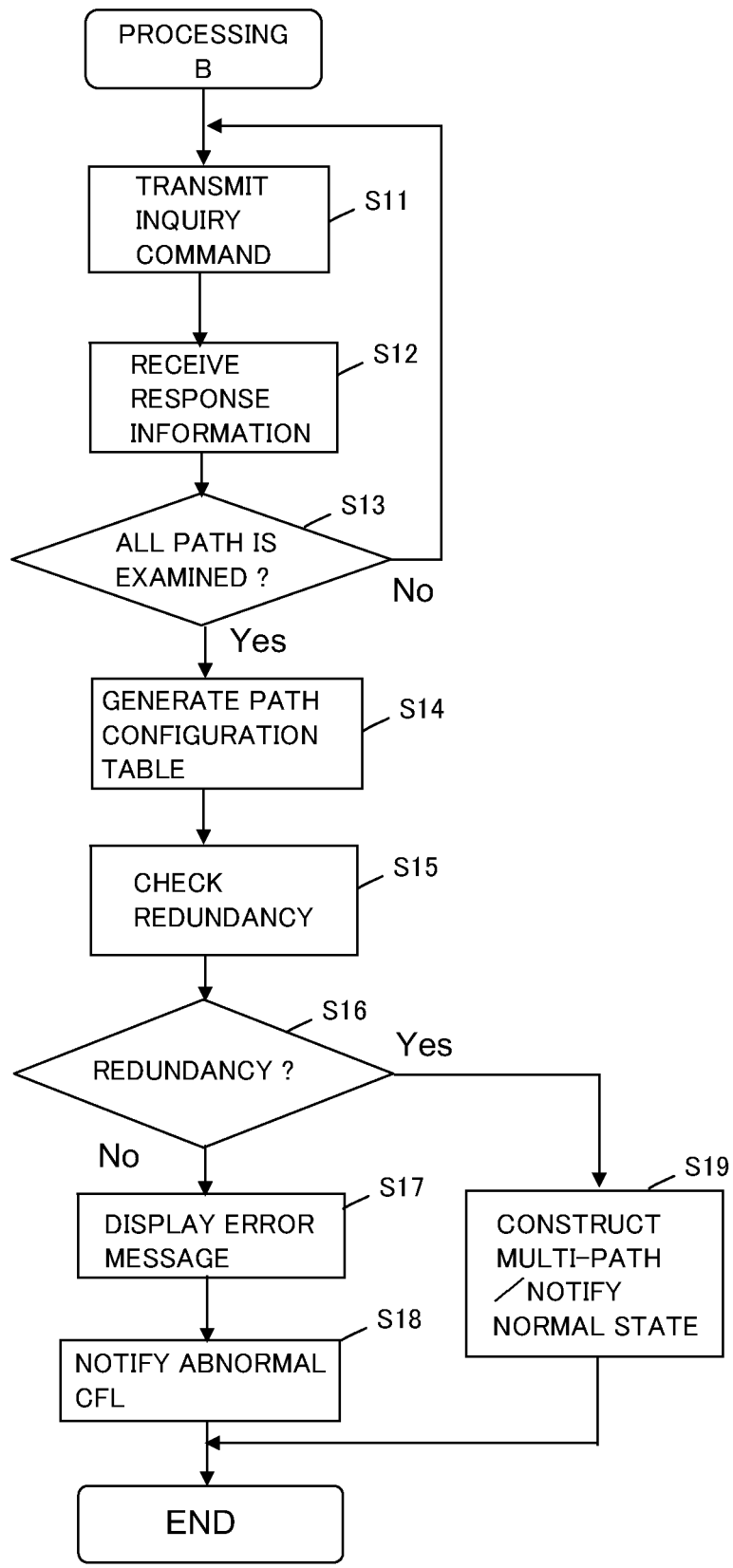
FIG. 8 is a flowchart of processing B of a host.

FIG. 8 is a flowchart of processing B of the host. First, the I/O control unit 14 transmits an inquiry command on a port basis (step S11). The inquiry command is to inquire of a CM number for identifying the CM 22 or 32 connected to a path and the exchange order of each firmware of the CM 22 or 32.

The I/O control unit 14 waits for the storage device 2 to receive response information (step S12). The I/O control unit 14 determines to be the failure of the path if the response from the storage device 2 is not received.

If the I/O control unit 14 receives response information from the storage device 2, the I/O control unit 14 checks whether all paths have been examined (step S13). If all paths have been examined, the path configuration table 84 is generated based on the response information (step S14). Next, the I/O control unit 14 checks redundancy (step S15). Under the following conditions, the check result shows that paths are considered as no redundancy (step S16). To be specific, if the exchange orders in the path configuration table 84 are all set to "1", all paths are connected to the first half, the CM 22 as in the path configuration table 84 of FIG. 4B. Further, if the exchange orders in the path configuration table 84 are all set to "2", all paths are connected to the second half, the CM 32. In such cases, since firmware exchange cannot be performed, the I/O control unit 14 stops constructing multipath and displays an error message indicating improper connection. And when the response information from the storage device 2 is not received, the I/O control unit 14 displays an error message indicating the failure of the path (step S17). Then, the I/O control unit 14 of the host device 11 notifies the storage device 2 of the abnormal state using a state notification command (step S18). As a result, multipath is not constructed. The maintenance person recoveries the error between the host 11 and the storage device 2 based on the error message.

On the other hand, in the connection state shown in the path configuration table 84 of FIG. 4A, for example, path connection configuration is considered redundant. The exchange orders in the path configuration table 84 are set to "1" and "2" and thus different, not identical. In this case, since firmware exchange can be performed based on the path configuration table 84, multipath is constructed. Then, the I/O control unit 14 of the host device 11 notifies the storage device 2 of the normal state using a state notification command (step S19). However, if one path is a failure and the other two paths are normal when the storage system 1 has, for example, three paths, the paths can be determined to be redundancy.

Referring back to FIG. 7, a detailed description is given below. The I/O control unit 14 transmits the inquiry command to the storage device 2 when the state of processing of the host 11 is not start-up processing (step S3).

Next, the I/O control unit 14 determines whether the failure of the path occurs (step S4).

The I/O control unit 14 determines to be the failure of the path when the normal response information to the inquiry command transmitted to the storage device 2 is not received.

Next, the processing B is executed for the rest of the paths when the failure of the path occurs (step S5).

The I/O control unit 14 determines whether the path is recovered after the processing B ends (step S6).

When the I/O control unit 14 determines that the path is recovered, the I/O control unit 14 executes the processing B (step S7).

The I/O control unit 14 displays the recovery message after the end of the processing B (step S8).

The I/O control unit returns to the step S3 after the end of the processing B.

Figure 9:
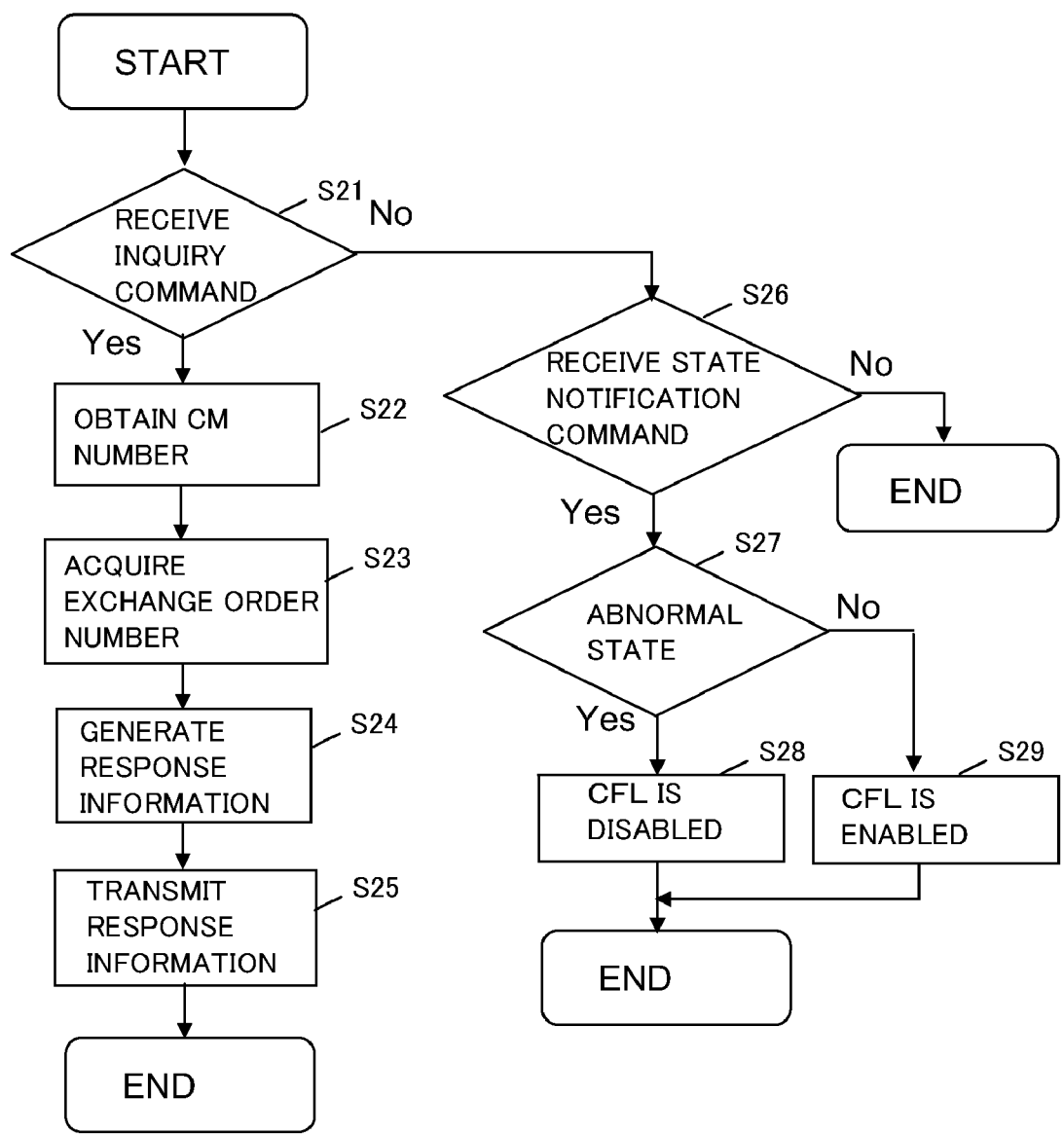
FIG. 9 is a flowchart of processing of a storage device.

FIG. 9 is a flowchart of processing of a storage device. In FIG. 9, the following explanation is explanation of the processing of CM 22. Explanation of processing of CM 32 is omitted for the explanation similar to the processing of CM 22. The CM 22 determines whether a received command is the inquiry command (step S21). When the received command is the inquiry command, the CM 22 obtains a CM number of the CM 22 and a CA-WWN (step S22). Next, the device acquires the exchange order number (step S23). The exchange order number is assigned to each CM in advance.

Next, the CM 22 generates response information (step S24). In this embodiment the response information includes a CA-WWN, a CM number, and the exchange order number. The CM 22 transmits the generated response information to the host 11 through the CA 21 or 31 ((step S25). Meanwhile, the CM 22 determines whether the received command is a state notification command when the received command is not the inquiry command (step S26). When the received command is the state notification command, the CM 22 determines whether the state notification command notifies the abnormal state (step S27). If abnormal state is notified, the CFL is disabled. Thus, the CFL is not performed even if a maintenance person issues an instruction to execute CFL (step S28). If normal CFL is notified, the CFL is enabled (step S29). Thus, the storage device 2 starts CFL in response to an instruction to execute CFL.

When the received command is not the state notification command, the processing ends. Next, an operation of the CFL is described.

(Explanation of Firmware Exchange Operation)

Referring to FIG. 2, firmware exchange in the storage device 2 is described.

In this example in FIG. 2, cable connection involves no error.

The storage system 1 assures connectivity of a path between the storage device 2 and the hosts 11 and 61, and then performs firmware exchange. On the host 11 or 61 side, connectivity with the storage device 2 is monitored. When connection with the storage device 2 is established, any failure occurs, or any failure is eliminated, the storage system issues a state notification command to notify the storage device 2 of each state of the hosts 11 and 61.

The storage device 2 side has plural paths connected with the hosts 11 and 61 connected to the storage device 2. The storage device 2 registers state information received from the connected hosts 11 and 61 in the management table 91 for each path of the hosts 11 and 61. In response to a request to start firmware exchange from a maintenance person, the storage device 2 first exchanges firmware of the CM 22 if a path state of the host 11 or 61 in the management table 91 is "normal". At this time, the storage device 2 can perform an operation via paths of the CM 32. After the completion of firmware exchange in the CM 22, firmware of the CM 32 is next exchanged. At this time, the storage device 2 can perform an operation via paths of the CM 22.

On the other hand, in response to a request to start firmware exchange, the storage device 2 does not perform firmware exchange if a path state of the host 11 or 61 in the management table 91 is "abnormal".

In this way, the host 11 or 61 can construct multipath in consideration of redundancy for hot-swap of firmware.

Further, the following configuration may be employed. That is, at the time of determining whether to allow firmware exchange, if exchange is disabled, multipath is constructed and a warning message is output. In this case, multipath that disallows firmware exchange is constructed.

Further, in the storage system 1, multipath would not be automatically constructed during a boot sequence of the host 11 or 61 depending on the type of an OS. In this case, a maintenance person inputs an instruction to generate multipath information to thereby determine whether to allow firmware exchange and then construct multipath.

What is claimed is:

1. A storage system comprising:
   a host device; and
   a storage device connected to the host device through plural paths and including a disk unit and control modules, the control modules controlling data transmission and reception between the host device and the disk unit through the plural paths,
   the host device including;
   a command control unit to generate an inquiry command about whether to allow firmware exchange of the control module and to generate a status notification command about whether to allow the firmware exchange of the control module in each of the plural paths;
   a command transmitting unit to transmit the generated inquiry command and the generated status notification command to the storage device in each of the plural paths;
   a response information receiving unit to receive a response information that includes a predetermined firmware exchange order number of the control module from the storage device as a response to the inquiry command in each of the plural paths; and
   a connection control unit to request the command control unit to issue a state notification command to notify the storage device of an abnormal state when all of the firmware exchange order numbers in the response information received from the plural paths are the same, and to request the command control unit to issue the state notification command to notify the storage device of a normal state when at least one of the firmware exchange order numbers in the response information differs from another firmware exchange order number, and
   the storage device including;
   a receiving unit to receive the inquiry command and the status notification command from the host device;
   a response information generating unit to generate the response information including the predetermined firmware exchange order number of the control module to the received inquiry command;
   a transmitting unit to transmit the generated response information to the host device; and
   a firmware exchange control unit to not perform the firmware exchange of the control module when the abnormal state is notified, and to perform the firmware exchange of the control module in an order of the firmware exchange order numbers when the normal state is notified, in response to a request to start the firmware exchange from a user.

2. The storage system according to claim 1, wherein the host device further includes an error display unit to display an error message, and the error display unit displays the error message when the determination unit determines that firmware exchange is disabled.

3. A storage device connected to a host device through plural paths and including a disk unit and control modules, the control modules controlling data transmission and reception between the host device and the disk unit through the plural paths, comprising:
   a receiving unit to receive an inquiry command and a status notification command from the host device;
   a response information generating unit to generate the response information including the firmware exchange order number of the control module to the received inquiry command;
   a transmitting unit to transmit the generated response information to the host device; and
   a firmware exchange control unit to not perform the firmware exchange when the abnormal state is notified, and to perform the firmware exchange in order of the firmware exchange order number when the normal state is notified, in response to a request to start the firmware exchange from a user.

4. A host device that is connected to a storage device configured to perform firmware exchange through plural paths, comprising:
   a command control unit to generate an inquiry command about whether to allow firmware exchange of the control module and to generate a status notification command about whether to allow firmware exchange of the control module in each of the plural paths;
   a command transmitting unit to transmit the generated inquiry command and the generated status notification command to the storage device of the control module in each of the plural paths;
   a response information receiving unit to receive a response information that includes a predetermined firmware exchange order number of the control module from the storage device as a response to the inquiry command in each of the plural paths; and a connection control unit to request the command control unit to issue a state notification command to notify the storage device of an abnormal state when all of the firmware exchange order numbers in the response information received from the plural paths are the same, and to request the command control unit to issue a state notification command to notify the storage device of a normal state when at least one of the firmware exchange order numbers in the response information differs from another firmware exchange order number.

5. The host device according to claim 4, further comprising:

an error display unit to display an error message, which displays the error message when the determination unit determines that firmware exchange is disabled.

* * * * *